Dec. 24, 1968     J. A. WELLS     3,417,656
POWER CONTROLLER AND AUGMENTOR FOR CARTRIDGE AND
PYROTECHNICALLY POWERED DEVICES
Filed Sept. 20, 1965     5 Sheets-Sheet 1
*Fig. 1.*
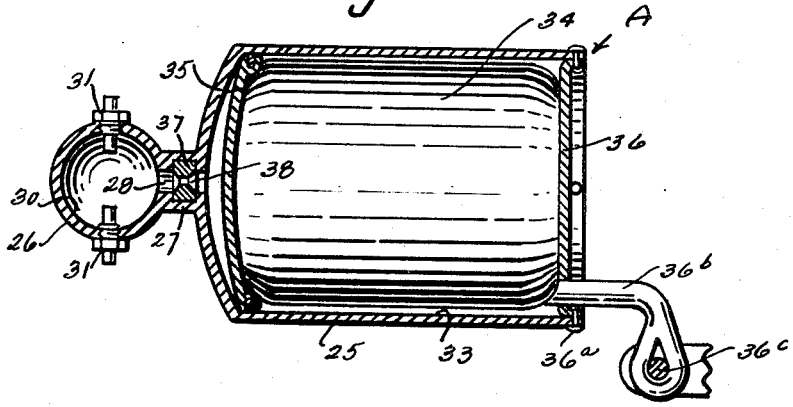
*Fig. 2.*   *Fig. 3.*   *Fig. 4.*
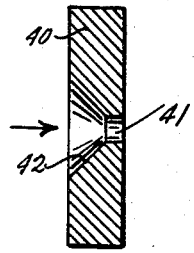 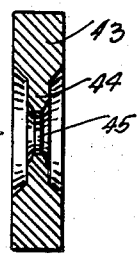 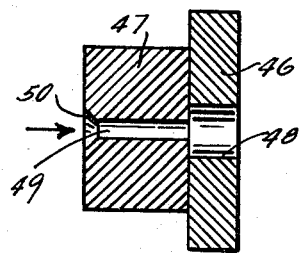
*Fig. 5.*
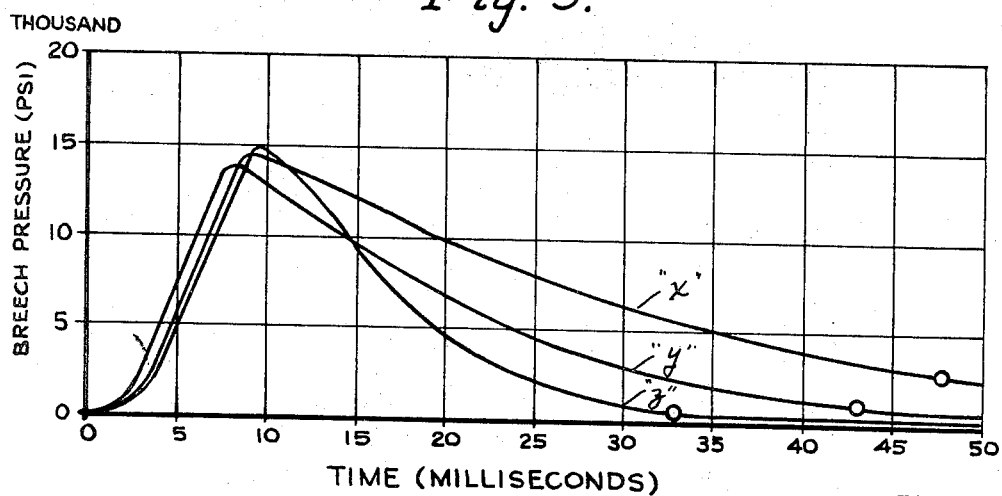
INVENTOR
JOHN A. WELLS
BY Rommel, Allwein & Rommel
ATTORNEYS

INVENTOR
JOHN A. WELLS

Dec. 24, 1968    J. A. WELLS    3,417,656
POWER CONTROLLER AND AUGMENTOR FOR CARTRIDGE AND
PYROTECHNICALLY POWERED DEVICES
Filed Sept. 20, 1965    5 Sheets-Sheet 3
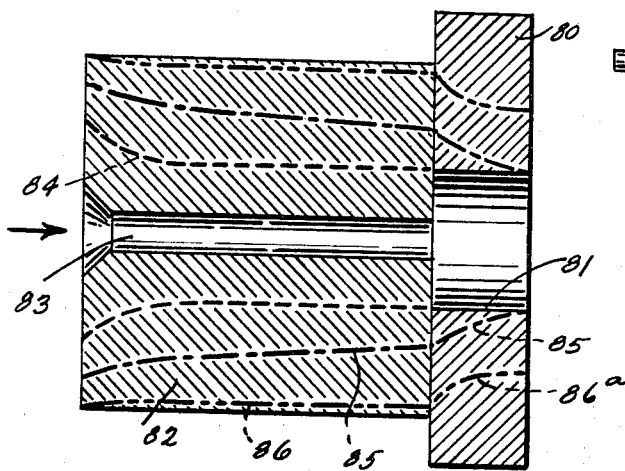
Fig. 8.
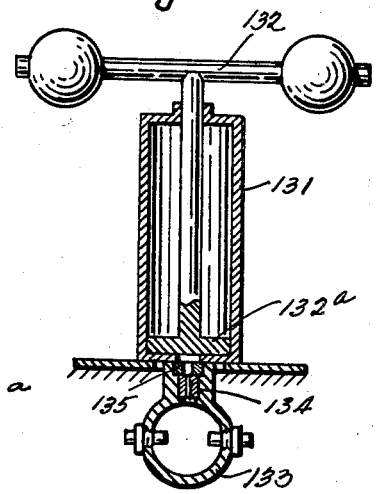
Fig. 18.
Fig. 18a.
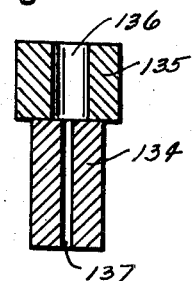
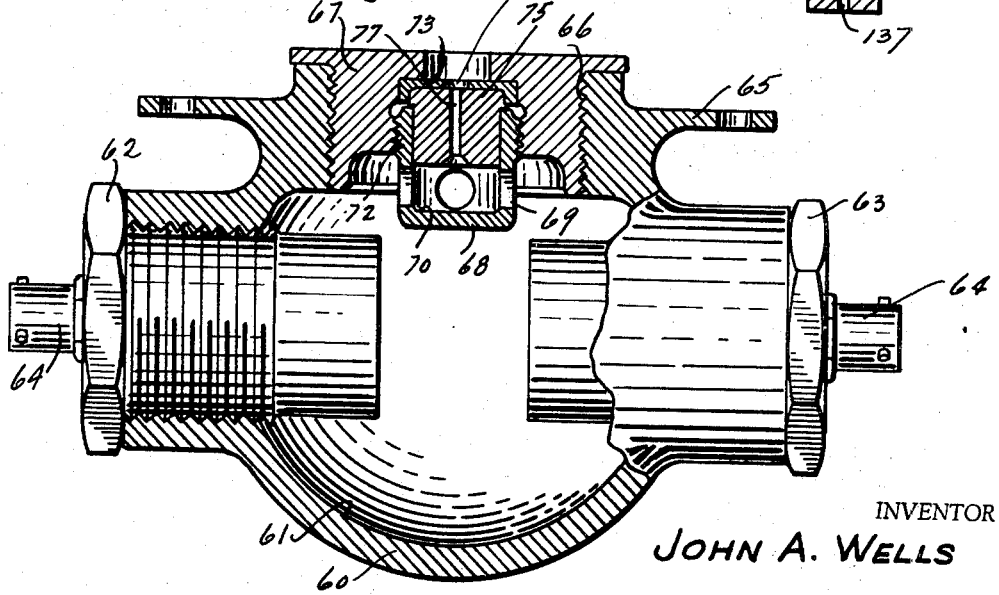
Fig. 19.
INVENTOR
JOHN A. WELLS
BY Rommel, Allwine and Rommel
ATTORNEYS

INVENTOR
JOHN A. WELLS

Dec. 24, 1968  J. A. WELLS  3,417,656
POWER CONTROLLER AND AUGMENTOR FOR CARTRIDGE AND
PYROTECHNICALLY POWERED DEVICES
Filed Sept. 20, 1965  5 Sheets-Sheet 5

INVENTOR
JOHN A. WELLS

BY *Rommel, Allwine and Rommel*
ATTORNEYS

United States Patent Office 3,417,656
Patented Dec. 24, 1968

3,417,656
POWER CONTROLLER AND AUGMENTOR FOR CARTRIDGE AND PYROTECHNICALLY POWERED DEVICES
John A. Wells, Northridge, Calif., assignor to Irving Air Chute Company, Inc., Lexington, Ky., a corporation of New York
Filed Sept. 20, 1965, Ser. No. 488,482
2 Claims. (Cl. 89—1)

ABSTRACT OF THE DISCLOSURE

A power controller and augmentor provided in connection with pyrotechnically powered devices, such as a mortar. It has an orifice providing member located between a load receiving chamber and a breech mechanism and which orifice providing member is constructed of erodable, combustible or consumable material which during the passage of an explosive charge through the orifice will enlarge the orifice for the purpose of increasing the energy output in the load receiving chamber whereby to maintain a substantial constant pressure in order to move the load in the chamber of the actuator from the start of load movement and during travel along the chamber.

---

The present invention relates to means for simultaneously augmenting and controlling the output and performance of cartridge actuated and pyrotechnically powered devices through the use of means providing eroding, consumable and/or combustible orifices.

Cartridge actuated devices have heretofore been used in connection with short stroke actuators, line cutters, drogue guns, mortars, etc. In connection with such devices as mortars, pyrotechnically inflated flotation or impact bladders, long stroke actuators and other like functional devices requiring a power input of a relatively sustained nature instead of a meteoric pressure rise and drop. The use of mere cartridge power has been inefficient. It is therefore a purpose of the present invention to provide means establishing a power control and power augmenter constructed for eroding, combustible and/or consumable orifice providing members which will permit pyrotechnical power in a unit for which adapted over the full functional cycle while in use for the purpose of increasing the energy output of the unit without excessively increasing the amount of explosive composition used.

In connection with the utilization and design of mortars in the field of aerial recovery, it is known to provide a mortar casing with a parachute pack therein; means being provided to blow out the pack utilizing an explosive charge. Under circumstances, such as variant loads to be ejected from the casing, performance is erratic. It is known to provide a member having a fixed orifice between the breech chamber and the low pressure chamber containing the load to be ejected. Such fixed orifice structures have generally been inefficient and functionally unsatisfactory. The twin goals of mortar performance are high muzzle velocity and low reaction load. The difficulty in providing a member having a fixed orifice results in inability of the orifice to pass enough gas to the pack or load accelerating along the mortar tube. The orifice measurements can be such as to provide for a rapid initial gas flow into the mortar tube. While this imparts a greater initial acceleration to the pack, the pressure cannot be maintained behind the initially faster moving load in the mortar casing. It is therefore a purpose of the present invention to provide control means for breech type mortars having an orifice or orifices which consists of an eroding orifice, combustible and/or consumable orifices.

A further object of this invention is to provide in a mortar or pyrotechnically powered device an orifice control structure capable of power regulation and power augmentation and wherein the orifice or orifices increase in size at an even increasing rate as the stroke of the mortar progresses and wherein the orifice material is combustible and will burn as a fuel and add to the output of the mortar power unit during the part of the functional cycle when increased output is most desirable.

A further object of this invention is the provision of power control devices for mortars and other pyrotechnically controlled devices which includes a combination of two or more orifice providing members between the breech and tube, of such nature that at least one of them comprises a consumable member and/or a combustible member having an orifice, and in addition an orifice providing eroding member which erodes at a less rate than the material of the combustible or consumable member at its orifice whereby to maintain substantially constant pressures behind the moving load of the mortar from the start of its movement to ejection thereof.

Other objects and advantages of this invention will be apparent during the course of the following detailed description.

In the accompanying drawings, forming a part of this specification, and wherein similar reference characters designate corresponding parts throughout the several views:

FIG. 1 is a cross sectional view taken through a mortar constructed to eject a parachute pack for aerial recovery purposes.

FIGS. 2, 3 and 4 are cross sectional views taken through different forms of orifice providing members which may be used in a mortar or other pyrotechnically powered devices for power and load augmenting control according to the purposes of this invention.

FIG. 5 is a diagrammatic view showing, by curves, the test results obtained by using members having eroding and consumable orifices.

FIG. 8 is a cross sectional view taken through an orifice providing assembly comprising an orifice providing eroding member and an orifice combustible member, showing in dot and dash lines the relative sizes of the orifices of the combustible and eroding members at various stages during the functioning of the mortar.

FIGS. 10b, 11b, 12b, 13b, 14b and 15b are respectively orifice diameter and time curves demonstrating the degree of control of flow restriction of gases and modulation attainable through the use of the orifice providing members shown respectively in FIGS. 10a, 11a, 12a, 13a, 14a and 15a.

FIG. 18 is a cross sectional view through a thrust or actuator device utilizing the improved orifice providing combination of consumable orifice providing member and eroding orifice providing member effective to provide desired after-stroke holding force.

FIG. 18a shows the orifice providing members used in the device of FIG. 18.

FIG. 19 shows a typical pyrotechnic power unit utilizing the improved combination of orifice providing combustible and eroding members.

Figure 6:
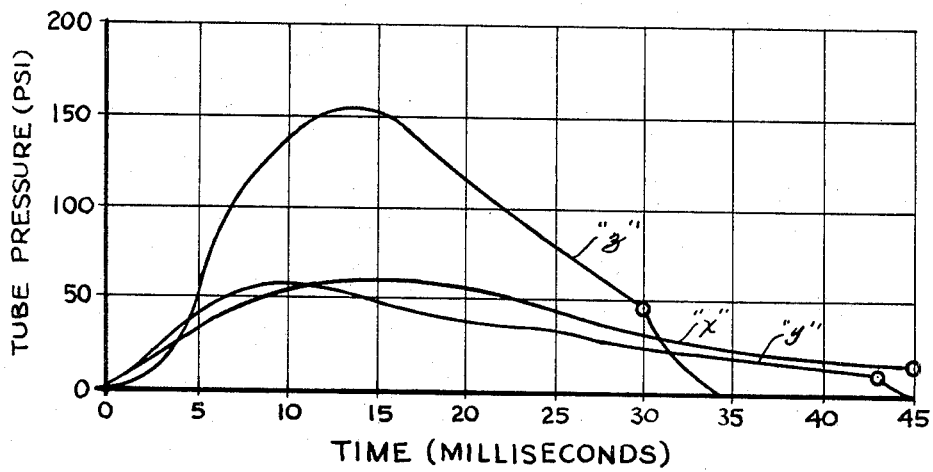
FIG. 6 is a diagrammatic view showing, by curves, the results of tests obtained using control orifice providing members, both eroding and combustible and designating mortar pressures versus time.

In the drawings, wherein for the purpose of illustration are shown various forms of the invention, the letter A may generally designate a mortar, comprising a tube 25 and a connected breech casing 26, having an orifice supporting neck 27 provided with a passageway 28 therethrough wherein is located an orifice providing member or members. The breech casing 26 has a firing chamber 30 and has mounted thereon cartridge supporting means 31. The mortar tube 25 has a chamber 33 therein adapted to receive a load, such as a parachute pack 34, and having slidable therein a sabot or free piston 35. The casing 26 is provided with the usual ejectable mortar cover 36 held in place by shear pins 36a. The end of the parachute riser is shown at 36b having a vehicle attachment point 36c.

The mortar A of FIG. 1 has an orifice providing member 37 mounted on the neck 27 of the mortar across the passageway 28 and itself being provided with an orifice 38 between the breech pressure area and the low pressure between the sabot and the orifice providing member. If an orifice providing member is of such material as to provide only a fixed orifice 38, gross inefficiency will result and high mortar performance cannot be obtained. That is true because if the orifice diameter is too small the inflow of breech gases cannot keep up with the rapidly increasing volume behind the moving parachute pack sabot and this materially affects acceleration of the pack along the length of the tube. On the other hand, if a larger fixed orifice diameter is used, inefficient propellant combustion results from the lower pressure levels in the breech. In addition, the immediate high gas flow rate into the tube causes an extreme initial acceleration of the sabot and pack bottom which produces excessive reaction loads. Furthermore, the dynamic reaction of the parachute pack under such circumstances damps the effect of the initial acceleration and little actual increase in pack exit velocity is realized.

While it is the purpose of this invention to employ an orifice providing member constructed of material which will erode under the influence of gases produced in the breech as they pass through the orifice, it has been found that the initial erosion takes place when least desired and that an increased rate of erosion is not obtained because of the twin effects of rapid pressure drop in the breech and reduced flow interference through the ever increasing diameter of the orifice. It is therefore a purpose of this invention to provide, in addition to an eroding orifice providing member, other orifice providing members such as a combustible orifice providing member and/or a consumable orifice providing member. These can be used in various combinations.

The orifice providing members are located in the neck of the mortar A at the location of the member 37 and variant forms may be used both as to materials and initial relative size of orifices.

By way of example:

(1) The orifice providing eroding member may be made of stainless steel, titanium, copper, brass, and/or bronze, and perhaps other eroding materials.
(2) A consumable orifice providing member may be provided, formed of lead or inflammable plastics, such as "Bakelite" or "Lucite" and even hard synthetic rubbers.
(3) The orifice providing combustible member may be made of aluminum, magnesium, beryllium and its alloys.

In FIG. 2 is shown an eroding member or disc 40 having a small orifice 41, centrally therein, and which flares out at the breech chamber side of the disc as shown at 42. It will be understood from the foregoing that an eroding orifice is essentially an orifice which increases in diameter during the functional cycle as a result of the erosive effects of gas flow from the breech upon the material of which it is constructed. If an eroding member alone is used the erosion will occur early in the functional cycle and will decay rapidly due to the decreasing flow rate of the gas; the decrease being due to the enlargement of the orifice and due to rapid drop in gas temperature and pressure.

In FIG. 3 is shown a different type of erosion member 43 having a reduced thickness central portion 44, provided with an orifice 45 therein; the member 44 flaring outwardly at both sides from the plane of the orifice 45.

In FIG. 4 there is shown a combination of orifices provided members, comprising an eroding member 46 and a consumable member 47. The eroding member is provided with an orifice 48 of a predetermined diameter and the consumable member 47 is provided with a smaller diametered orifice 49 which may taper in enlargement at its breech side as shown at 50 in FIG. 4.

The consumable orifice is destroyed during the functional cycle. This occurs as a result of the pressure and heat from the breech high pressure chamber. There is a definite lapse of time between the initial onslaught of heat and pressure from the breech chamber and the time when the orifice material begins to give way. Once the consumption begins it progresses at an ever increasing rate. Early in the functional cycle, or even prior to the beginning of consumption, some erosion of the orifice 49 may take place. As the material is brought nearer the temperature where actual consumption takes place, it becomes structurally weaker and the rate of dissipation therefore increases rapidly. As the consumable orifice reaches the point where it is no longer capable of retaining its physical configuration because of the effects of heat and great pressure, the material begins to flow or burn away, resulting in a still more rapid increase of the aperture through which the gases are passing from the high pressure to the low pressure side of the orifice providing member. It is thus seen that the eroding member provides a backup or control orifice because the material of which it is formed is less susceptible to the eroding effects of heat and pressure and can be incorporated to limit the maximum orifice diameter obtained.

So far as a combustible orifice providing member is concerned, the word "combustible" is used in its literal meaning, that is, inflammable or capable of taking fire. Such type of orifice providing member acts much in the same manner as a consumable orifice, for with the added circumstance that under the conditions of temperature and pressure imposed on it during the functional cycle, it actually burns as a fuel and in so doing, adds considerably to the total energy output of the power unit, principally by way of a marked increase in the temperature of the products of combustion.

A further amplification of the functioning of the combination of a combustible or consumable orifice providing material and an eroding member, the combustible providing material tends to increase the orifice more rapidly than is compatible with the rest of the functional device. In such case, the eroding member has an orifice diameter somewhat larger than the starting diameter of the combustible orifice at the downstream side. The principal function of the orifice providing eroding member is to provide an inhibiting effect on the rapid increase in the aperture size of the combustible or consumable member once a predetermined diameter has been reached. By proper selection of materials and the proper sizing of the components the timing of pressure rise and time of peak pressure in the low pressure chamber can be controlled to a remarkable degree. In addition, the twin factors of high temperature in the persence of molten material in the gas flow path causes a radial increase in the erosion rate on the downstream side eroding orifice as compared to the same setup without the combustible or consumable orifice upstream. This means that the rate of increase of apertured size on the eroding orifice installed downstream can be throttled by merely changing the thickness of the eroding orifice providing member. Orifice requirements can be determined by testing and several factors should be considered, such as the following:

(1) Inertia of the mass being accelerated.
(2) Side wall friction.
(3) Initial restraint and release.
(4) Internal pack dynamics.

It is therefore apparent that determination of orifice diameters, thicknesses, contours, and materials must be accomplished empirically.

The words "consumable" and "combustible" in connection with orifice providing material should not be used interchangeably, because the combustible orifice providing material during tests revealed a tremendous increase in the controlled output of the power units. The material used in tests was aluminum and the burning thereof raised the temperature of the gates, thus raising the pressure for a given volume or increasing the volume for a given pressure.

In further amplification of the breech structure, FIG. 19 shows a typical pyrotechnical power unit which includes a casing structure 60 having a breech chamber 61 therein and diametrically opposed thereto having pyrotechnic cartridge supporting means 62 and 63 provided with conventional electrical connectors 64. A single cartridge may be used, if desired, preferably on the extended centerline of the orifices. Such a cartridge may have single or dual ignition elements, each having an individual electrical connector. A mounting flange 65 is provided as part of the casing structure. The body of the flange is provided with a screw threaded opening 66 adapted to receive a plug 67; this plug being provided for the purpose of supporting the orifices providing combination. The latter preferably includes a cup-shaped retainer 68, open at 69 to its chamber 70. The retainer 68 is screw threaded at 72 into the plug 67, as shown.

The orifice providing combination shown in FIG. 19, includes an eroding orifice providing member 73 having a central 74 opening therein and a combustible orifice providing member 75 having an orifice 77 centrally therethrough, aligned with the orifice 74 and being of smaller diameter than the orifice 74. The cup-shaped retainer 68 engages the head flange of the combustible member 75 and forces the same against the eroding member 73 to hold the orifice parts in position.

In FIG. 8 is shown the phases of erosion and combustion occurring on a test made using an eroding orifice providing member and a combustible orifice providing member. The eroding orifice providing member 80 is provided with an orifice opening 81 centrally therein and the combustible orifice providing member 82 is provided with a central smaller orifice 83 therein of the nature described for the form of invention shown in FIG. 4. The full lines for these orifices 81 and 83 indicates the original internal contours. The initial erosion of the combustible orifice providing member 82 is indicated at 84 and the combination of orifice burning for both the combustible orifice providing member and eroding orifice providing member is indicated by the single dot and dash lines shown at 85. The double dot and dash lines 86 indicate the final or post-firing internal contours of the orifices of the two members 80 and 82.

Figure 10A:
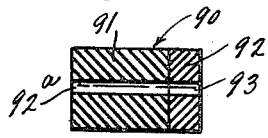
FIGS. 10a, 11a, 12a, 13a, 14a and 15a show various assemblages of the improved orifice providing members adapted for utilization in mortars or other pyrotechnic devices wherein they are capable of being used.
Figure 10B:
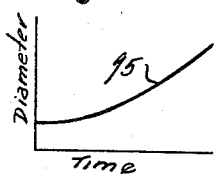

Referring to FIGS. 10$^a$ to 15$^a$ inclusive and 10$^b$ to 15$^b$ inclusive, the same are examples of various orifice configuration combinations, together with orifice diameter versus time curves demonstrating the degree of control of flow restriction and modulation attainable through proper utilization of the orifice providing combinations.

In FIG. 10$^a$ is shown a unit 90 composed of a combustible or consumable orifice providing member 91 having a uniform diameter orifice passageway 92$^a$ therethrough and positioned at the down side thereof is an eroding orifice providing member or a control member 92 having an orifice 93 of approximately the same diameter as the passageway 92$^a$. The curve designating the degree of control of flow restriction and modulation attainable is indicated at 95 in FIG. 10$^b$.

Figure 11A:
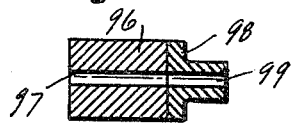
Figure 11B:
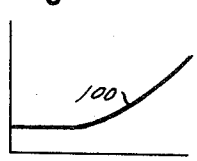

In FIG. 11$^a$ the combustible or consumable orifice providing member 96 has a passageway 97 therethrough and at the down side thereof is placed a nipple-shaped eroding orifice providing member 98 having a passageway 99 therethrough. The curve is designated at 100 in FIG. 11$^b$.

Figure 12A:
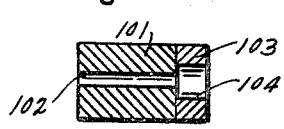
Figure 12B:
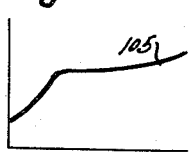
Figure 16A:
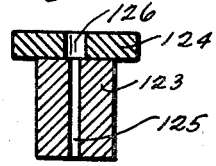
FIG. 16a is a cross sectional view of a combination eroding and combustible orifice providing setup as used in the mortar of FIG. 16.

In FIG. 12$^a$ is shown a combination consisting of a combustible or consumable orifice providing member 101 having on orifice 102 therethrough. A ring-shaped eroding orifice providing member 103 lies at the down side thereof and is provided with an orifice 104 of greater diameter than the diameter of the passageway 102. In FIG. 12$^b$ is shown the curve 105 for the combination shown in FIG. 12$^a$.

Figure 13A:
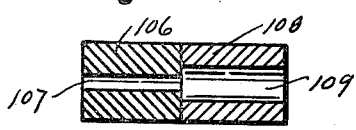
Figure 13B:
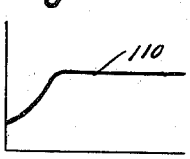

In FIG 13$^a$ the consumable or combustible orifice providing member 106 is provided with an orifice 107 therethrough and the eroding orifice providing member 108 is relatively longer than the like members for the forms of invention shown in FIGS. 10$^a$, 11$^a$ and 12$^a$ and provided with a diameter 109 greater in diameter than the orifice 107. The functional results are shown in the curve 110 of FIG. 13$^b$.

Figure 14A:
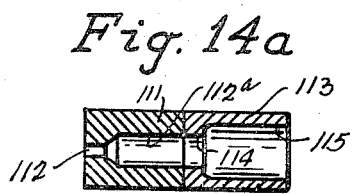
Figure 14B:
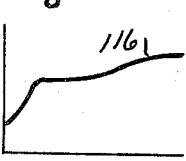
Figure 17A:
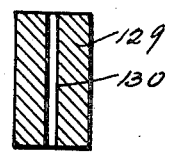
FIG. 17a is a cross sectional view taken through a combustible type of orifice providing member as used in the ejector of FIG. 17.

In FIG. 14$^a$ is shown a combustible or consumable orifice providing member designated at 111, which is relatively long and provided at the breech chamber side with a small diametered orifice 112 which opens into a longer and larger diametered orifice 112$^a$. At the down side is provided an eroding orifice providing member 113 having at its end abutting the member 111 an orifice diameter 114 of the same diameter as orifice 112$^a$. It opens into a larger diametered orifice 115; the functional curve being shown at 116 in FIG. 14$^b$.

Figure 15A:
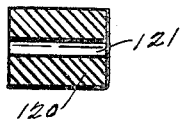
Figure 15B:
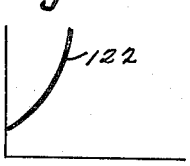

In FIG. 15$^a$ is shown a combustible or consumable orifice providing member 120 provided with an orifice 121 therethrough. The uniform functional curve 122 is shown in FIG. 15$^b$.

Figure 16:
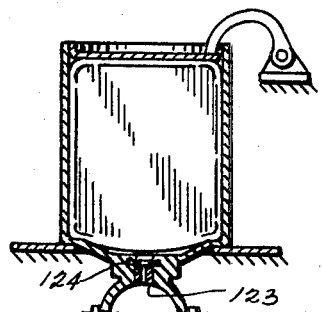
FIG. 16 is a cross sectional view taken through a parachute pack ejecting mortar utilizing the improved power and augmenting control orifice providing members of this invention.

In FIG. 16 is shown a parachute pack-type mortar provided with combustible and eroding orifices providing members 123 and 124 respectively, which are enlarged as shown in FIG. 16$^a$; said members being provided with orifices 125 and 126 respectively; the latter of which is of larger diameter.

Figure 17:
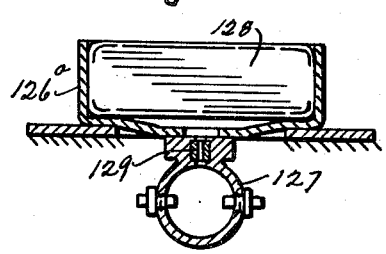
FIG. 17 is a cross sectional view taken through a short stroke payload ejector.

In FIG. 17 is shown a short stroke pay load ejector which may include a casing 126$^a$ having a breech 127. The chamber of the casing is provided with a pay load 128 and the breech at the down side thereof is provided with a combustible orifice providing unit 129, shown in enlargement in FIG. 17$^a$ and having an orifice 130 therethrough. The uninhibited combustible orifice providing member 129 provides for very fast orifice diameter increase to build the main pressures over the short power stroke of the device. Greatly increased power output is also obtained with the use of the combustible member.

With reference to FIGS. 18 and 18a wherein is shown a thrust or actuator intended to be held at the end of a stroke, the same comprises a tubular casing 131 provided with the member 132 to be actuated; the same having a piston 132a which slides in the barrel or casing 131. The breech 133 has an orifice providing combination which consists of a consumable orifice providing member 134 and a non-eroding orifice providing member 135 having a passageway 136 therethrough, larger in diameter than the diameter 137 of the consumable member 134. In this device the consumable orifice provides gas flow control. The non-eroding orifice providing member 135 sets the maximum diameter to be obtained. A combustible orifice providing member is not used since increased output in the form of elevated gas temperature would quickly dissipate from cooling and be ineffective in providing the required after stroke holding force.

Referring to FIG. 5, the curves are plotted, time in milliseconds versus breech pressure in thousands of pounds per square inch. Test X utilized a stainless steel orifice member having an initial orifice diameter of .109 of an inch. Test Y shows a breech pressure test utilizing a stainless steel erosion member having an initial orifice diameter of .156 of an inch.

Text Z was conducted utilizing an augmenting and controlling unit consisting of a combustible member having an initial orifice of .078 of an inch and an eroding member having an orifice of initial diameter of .188 of an inch.

Tests X, Y, and Z were all run with identical cartridge loads. All the hardware was the same for each of the tests, and the same mortar tube and breech were used for all three tests. Pack exit velocities on tests X and Y were determined to be approximately 80 feet per second, whereas the pack exit velocity on test Z was determined to be in excess of 150 feet per second. FIG. 5 shows that in all three tests, X, Y, and Z the characteristics of breech pressure build-up was almost identical, peak values were within the normal anticipated spread and pressure decay followed paths commensurate with the known gas flow performance. Areas under the curves are reasonably close with test Z being on the minimal side.

In test X the erosion providing member orifice of initial diameter of .109 of an inch, eroded to .185 of an inch in diameter; the erosion member for test Y having an initial orifice of .156 of an inch in diameter, eroded to .274 of an inch; and in test Z the combustible member having an initial orifice of .078 of an inch was entirely consumed, and the eroding member associated therewith having an initial orifice diameter of .188 of an inch, eroded to .50 of an inch in diameter.

It will be obvious from the foregoing that the significant increase in power unit output exhibited in test Z, resulted from the use of a combustible provided orifice which performed four specific functions, as follows:

(1) Provided a small initial orifice diameter which contributed to efficient and repeatable burning of the explosive composition contained in the cartridges.
(2) Initially acted as an eroding orifice to initiate dilation of the gas outlet port (orifice diameter increase).
(3) Promoted the high rate of erosion required on the downstream eroding (control) orifice to continue the increasing rate of gas port dilation.
(4) Burned as a fuel to add significantly to the output of the power unit at a time when the initial reservoir of cartridge gases was becoming depleted.

FIG. 6 is a curve disclosure of the three tests above enumerated for FIG. 5, designating downstream tube pressure versus time in milliseconds. Here again the marked difference in performance shown for test Z resulted because of the combination of a combustible providing orifice with an erosion providing orifice member, showing the power unit energy output in relation to tests X and Y.

Figure 7:
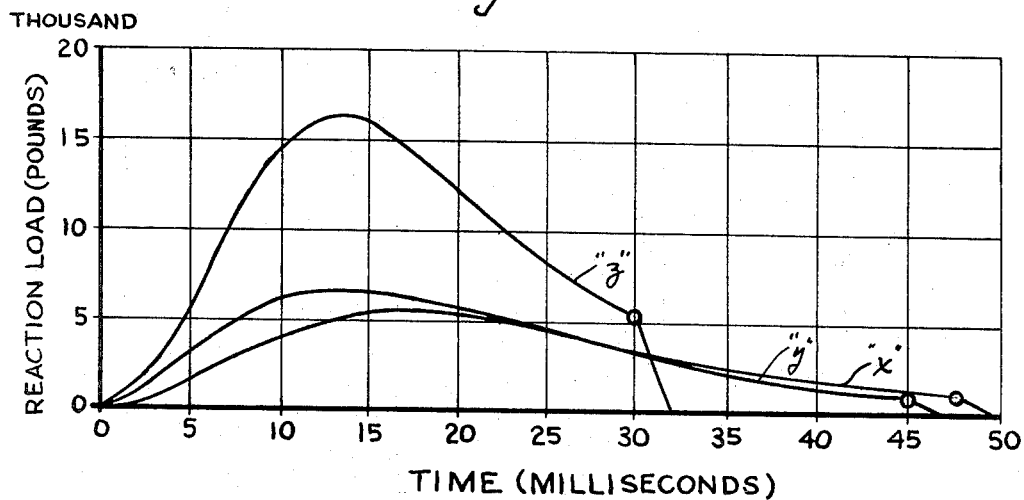
FIG. 7 is a diagrammatic view showing curve test results obtained in using members having eroding and combustible orifices, showing reaction loads versus time.

FIG. 7 shows, by means of curves, the reaction loads versus time in the tests X, Y and Z above enumerated and here again, shows the difference in relative effect downstream from the orifice providing members.

Figure 9:
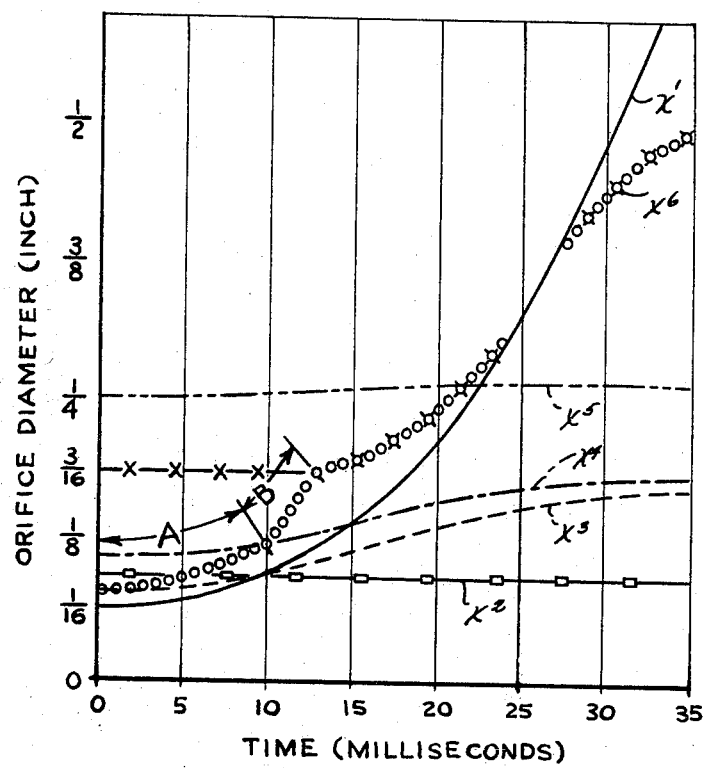
FIG. 9 is a diagrammatic view showing, by curves, large mortar tests resulting through the use of members having eroding and combustible orifices, measuring orifice diameter versus time during the functioning period, and also showing the improved results compared to utilization of only eroding orifice providing members.

FIG. 9 presents a graphic illustration of the manner in which various orifices performed during the functional cycle of a large mortar. The curve $X^1$ represents the ideal orifice diameter versus time which would produce the most efficient mortar performance by maintaining a constant pressure in the mortar tube during the entire stroke. If the diameter of an orifice is such as to produce a curve falling above the ideal curve $X^1$ excessive reaction loads will result. On the other hand, if a diameter of an orifice falls below the ideal curve $X^1$, acceleration of the load will be retarded and pack exit velocity will fall below the value attainable with the ideal curve. Thus, the mortar whose power unit orifices most nearly coincides in diameter with those producing the ideal curve, will be the most efficient.

Referring again to FIG. 9, the line $X^2$ is a diagrammatic functioning view in which the breech has a fixed orifice opening. The curves $X^3$, $X^4$ and $X^5$ designate the use at the down side of the breech of eroding members having orifices of different diameters.

The curve $X^6$ designates the breech use of an aluminum member having an orifice provided with .078 of an inch initial diameter with a stainless steel backup erosion member, having an orifice of .188 of an inch initial diameter.

In the diagram of FIG. 9, on test $X^6$, segment A represents erosion, while B represents the onset of consumption and/or combustion of the consumable or combustible member.

Figure 20:
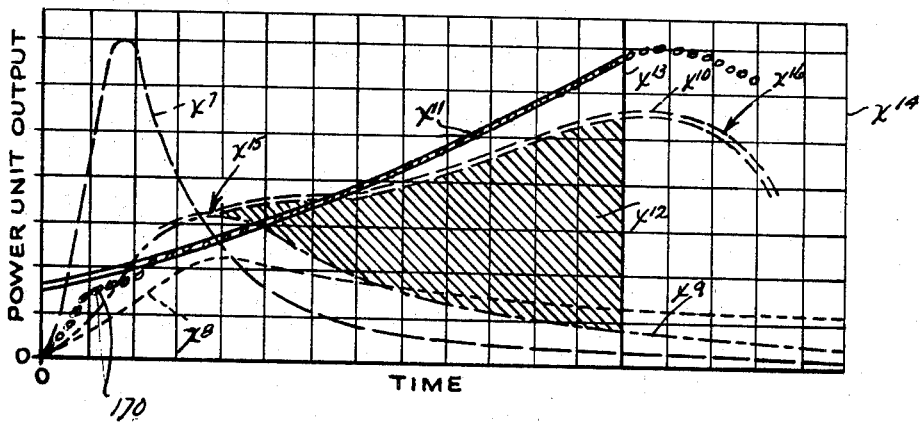
FIG. 20 is a diagrammatic view showing, by curves, the relative functional values of power unit output versus time.

FIG. 20 designates a curve setup showing the manner in which various pyrotechnical power units perform, several types being diagrammatically presented. The curves shown are as follows: $X^7$ designates an uncontrolled cartridge output (single chamber mortar); $X^8$ shows a test of a two-chamber mortar with a fixed orifice; $X^9$ shows power unit output versus time in a two-chamber mortar using an eroding orifice; $X^{10}$ designates power unit output versus time in a combination of combustible and eroding orifice providing members, and $X^{11}$ designates the output required for maximum mortar efficiency.

The cross hatched area $X^{12}$ represents the increase in output attributable to the use of a combustible orifice providing member.

In FIG. 20, the line $X^{13}$ designates the mortar pack exit as projected using combustible orifice power unit.

Line $X^{14}$ designates pack exit from the motar not using a combustible or consumable orifice power unit.

Location $X^{15}$ designates the start of burning of the combustible orifice providing member of the curve $X^{10}$.

$X^{16}$ designates burn-out of the combustible member on curve $X^{10}$.

Figure 21:
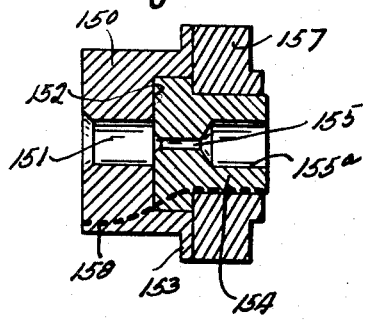
FIGS. 21 and 22 are orifice providing combinations which when used in mortars, provide for an increasing propulsive pressure in the mortar tube.

Referring to the power controller shown in FIG. 21, a combustible member 150 which may be of aluminum is used. It has an orifice 151 of desired cross sectional area therethrough and is provided with a forward facing socket 152. At its forward end it may be outwardly flanged at 153. A consumable or eroding member 154 is disposed in the socket 152 and it is provided with a breech facing small aperture or passageway 155 which is materially smaller in cross sectional area than the aperture 151. This eroding or consumable member aperture, at the down side, is enlarged as shown at 155a. Preferably brass is used as the eroding or consumable member 154. A stainless steel ring or member 157 is mounted upon the projecting end of the consumable member 154 and engages against the flange 153. It lies in non-eroding position. The stainless steel member 157 is non-eroding, so far as gas passage therethrough is concerned. It will be noted from FIG. 21 that a heavy dotted line, 158, is shown in designation of post-firing contour of the unit, showing how the majority of the combustible member is dissipated as well as the eroding or consumable brass member.

Figure 22:
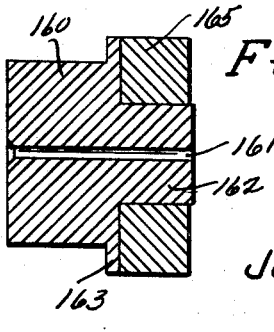

Referring to FIG. 22, I may provide a unit having a combustible member 160 which has an orifice 161 therethrough of desired cross sectional area. This aluminum combustible member may have a reduced down stream side projecting portion 162 and it may be flanged laterally intermediate its ends as shown at 163. The down side projecting reduced end has mounted thereon a stainless steel ring 165 in non-eroding position.

In a test of the unit shown in FIG. 21, started at zero, as shown in the lower left hand corner of FIG. 20 the power output rose rapidly, as indicated at 170, designated by the lines of small circles, until it encountered the ideal curve $X^{11}$; remaining on the $X^{11}$ curve all the way to the pack exit at $X^{13}$. The tube pressure curve of this unit therefore represents the ultimate in efficiency obtainable from a device of this type.

Various changes in the size, shape and arrangement of parts may be made to the forms of invention herein shown and described, without departing from the spirit of the invention or scope of the claims.

I claim:

1. In a power controller for cartridge and pyrotechnically powered devices, a unit comprising a combustible member having an orifice therethrough of a desired cross sectional area and at its fore end being provided with a socket, a second member selected from a group consisting of eroding material and consumable material having an orifice therethrough of cross sectional area less than the cross sectional area of the orifice of the first member and communicating therewith, the second member being disposed in the socket at the fore end of the combustible member, and the second member projecting forwardly beyond said combustible member, the fore end of said second member having an annulus mounted thereon in a non-eroding position, with respect to gases passing through the unit.

2. In a unit for augmenting and controlling the output and performance of pyrotechnically powered devices, the combination of a combustible orifice providing member having an orifice therethrough of a predetermined cross sectional area, a second member having an orifice therethrough communicating with the orifice of the combustible member and which second member is selected from a group consisting of eroding and consumable material and having an orifice of less cross sectional area where it communicates with the orifice of the first mentioned member, the second member projecting at its fore end beyond the fore end of the combustible member and having mounted thereon an outer annular stainless steel ring.

References Cited
UNITED STATES PATENTS

| | | | |
|---|---|---|---|
| 2,417,983 | 3/1947 | Holman et al. | 89—1 |
| 2,644,296 | 7/1953 | Sanz et al. | |
| 2,912,820 | 11/1959 | Whitmore | 60—200 |
| 2,952,972 | 9/1960 | Kimmel et al. | 60—256 |
| 3,156,091 | 11/1964 | Kraus | 239—265.11 |

SAMUEL W. ENGLE, *Primary Examiner.*

U.S. Cl. X.R.

239—602